US007573007B2

(12) United States Patent
Ishikawa

(10) Patent No.: US 7,573,007 B2
(45) Date of Patent: Aug. 11, 2009

(54) POWER SUPPLY, IMAGE FORMING APPARATUS, AND ELECTRIC CURRENT SUPPLY METHOD

(75) Inventor: Junji Ishikawa, Moriya (JP)

(73) Assignee: Canon Kabushiki Kaisha (JP)

( * ) Notice: Subject to any disclaimer, the term of this patent is extended or adjusted under 35 U.S.C. 154(b) by 397 days.

(21) Appl. No.: 11/467,280

(22) Filed: Aug. 25, 2006

(65) Prior Publication Data

US 2007/0045293 A1 Mar. 1, 2007

(30) Foreign Application Priority Data

Aug. 30, 2005 (JP) ............................ 2005-249951

(51) Int. Cl.

| | |
|---|---|
| ***H05B 1/02*** | (2006.01) |
| *H05B 6/08* | (2006.01) |
| *H05B 6/04* | (2006.01) |
| *G03G 15/00* | (2006.01) |
| *G03G 15/20* | (2006.01) |
| *H02H 3/08* | (2006.01) |
| *H02H 9/02* | (2006.01) |

(52) U.S. Cl. ...................... 219/497; 219/664; 219/665; 219/668; 399/37; 399/67; 399/88; 361/93.1

(58) Field of Classification Search ................ 219/497, 219/664–665, 668; 361/93.1; 399/37, 67, 399/88

See application file for complete search history.

(56) References Cited

U.S. PATENT DOCUMENTS

| | | | | |
|---|---|---|---|---|
| 6,930,293 | B2 * | 8/2005 | Matsuo et al. | 219/664 |
| 7,206,527 | B2 * | 4/2007 | Sasamoto et al. | 399/37 |
| 7,289,745 | B2 * | 10/2007 | Nara et al. | 399/88 |

FOREIGN PATENT DOCUMENTS

| | | |
|---|---|---|
| JP | 2000-223253 A | 8/2000 |

* cited by examiner

*Primary Examiner*—Albert W Paladini
*Assistant Examiner*—Dharti H Patel
(74) *Attorney, Agent, or Firm*—Rossi, Kimms & McDowell, LLP

(57) ABSTRACT

This invention provides a power supply which supplies an AC electric current to the coil of a heating unit employing the electromagnetic induced heating method via a connector connecting a plurality of wires, and a method for the power supply. The method includes the steps of supplying electric currents to the coil via 1st and 2nd wires from 1st and 2nd electric current supply units and detecting feedback electric currents via 3rd and 4th wires through the coil. Whether an electric current is abnormally supplied to the coil is monitored on the basis of these detected electric currents. It is controlled in accordance with the monitoring result to stop driving the 1st and 2nd electric current supply units and supply an electric current to the coil.

12 Claims, 12 Drawing Sheets

POWER SUPPLY, IMAGE FORMING APPARATUS, AND ELECTRIC CURRENT SUPPLY METHOD

BACKGROUND OF THE INVENTION

1. Field of the Invention

This invention relates to a power supply, an image forming apparatus, and an electric current supply method applied to them. More specifically, this invention relates to a power supply which supplies an electric current to a heating unit by using an induced heating method, an image forming apparatus which forms an image according to the electrophotographic method, and an electric current supply method applied to the power supply and image forming apparatus.

2. Description of the Related Art

An image forming apparatus which forms an image according to the electrophotographic method generally comprises a fixing unit for fixing a toner image transferred onto a printing medium. The fixing means often employs a heating method using a ceramic heater, halogen heater, or the like. Recently, the fixing means employs an electromagnetic induced heating method.

FIG. 12 is a block diagram showing the arrangement of a power supply which supplies power to a fixing unit using the induced heating method.

As shown in FIG. 12, a power supply 100 and fixing unit 7 are connected to each other by wires W1 and W2 via connectors A and B. The power supply 100 comprises a diode bridge 101, a filter capacitor 102, resonant capacitors 105 and 106 which form a resonant circuit, a coil L, and switching elements 103 and 104. The diode bridge 101 and the filter capacitor 102 form a circuit for supplying a direct current. The power supply 100 further comprises a driving unit 112 which drives the elements 103 and 104 respectively by driving signals D1 and D2, a control unit 113, a power detection unit 111 which detects power input from an AC power supply 500, and a temperature detection unit 114 which detects the temperature of an FB (Fixing Belt) serving as a conductive heating member.

The control unit 113 determines the driving frequencies of the driving signals D1 and D2 output from the driving unit 112 on the basis of the detection result by the power detection unit 111 and that by the temperature detection unit 114 (see, e.g., Japanese Patent Application Laid-Open No. 2000-223253). The switching elements 103 and 104 are alternately turned on/off in accordance with the driving signals D1 and D2 to supply a high-frequency electric current to the coil L.

Power control and temperature control of the fixing unit 7 are implemented using a change in power supplied to the fixing unit 7 in accordance with the driving frequencies of the driving signals D1 and D2.

However, according to the conventional induced heating method, the power factor is smaller than that of a ceramic heater or halogen heater. Power is a value calculated by multiplying the product of the effective values of an electric current and voltage by the power factor. To obtain a large heat amount, the electric current or voltage must be increased. However, connectors for supplying a large electric current are less stocked as components, are expensive, and have an excessively large size.

It is, therefore, desired to supply a large electric current while installing wiring with widespread connectors for a relatively small electric current.

SUMMARY OF THE INVENTION

Accordingly, the present invention is conceived as a response to the above-described disadvantages of the conventional art.

For example, a power supply, image forming apparatus, and electric current supply method according to the present invention are capable of supplying a large electric current while installing wiring with widespread connectors for a relatively small electric current.

According to one aspect of the present invention, preferably, there is provided a power supply which supplies an AC electric current to a coil of a heating unit employing an electromagnetic induced heating method via a connector connecting a plurality of wires.

More specifically, the power supply comprises the following building elements.

The power supply comprises first and second electric current supply devices which respectively supply electric currents to the coil via first and second wires, and first and second detection devices which respectively detect electric currents fed back via third and fourth wires through the coil. The power supply further comprises an abnormality monitoring device which monitors, on the basis of the electric currents detected by the first and second detection devices, an abnormality of supply of an electric current to the coil or an abnormality of the third wire or the fourth wire, and a control device which controls to stop driving the first and second electric current supply devices in accordance with a monitoring result by the abnormality monitoring device.

Note that connectors are desirably respectively arranged on the heating unit and the power supply, and each of the connectors desirably has at least first to fourth poles which connect the first to fourth wires, respectively. One end of the coil is desirably connected to the first and second poles of the connector on the heating unit, and the other end of the coil is desirably connected to the third and fourth poles of the connector on the heating unit.

Each of the first and second detection devices desirably comprises a comparison device which compares a peak value of the feedback electric current with a predetermined threshold.

The abnormality monitoring device desirably determines an abnormality as follows.

(1) The abnormality monitoring device determines that an excess current occurs when peak values of both the feedback electric currents via the third and fourth wires exceed the predetermined threshold as a result of comparisons by the comparison device of the first and second detection devices.

(2) The abnormality monitoring device determines that a wire is disconnected when the peak value of one of the feedback electric currents via the third and fourth wires exceeds the predetermined threshold and the other of the feedback electric currents is "zero" as a result of comparisons by the comparison device of the first and second detection devices.

The abnormality monitoring device desirably notifies an external device by a signal indicating occurrence of the excess current or occurrence of the disconnection. At this time, the abnormality monitoring device desirably notifies the external device of occurrence of the excess current by a first signal, and of occurrence of the disconnection by a second signal.

Each of the first and second electric current supply devices desirably includes a switching element, and a driving circuit which drives the switching element by supplying a driving signal to the switching element.

The control device desirably controls to forcibly stop driving the switching element by the driving circuit upon occurrence of an excess current or occurrence of disconnection.

According to another aspect of the present invention, preferably, there is provided an image forming apparatus, for forming an image according to an electrophotographic method, to which an electric current is supplied from a power supply having the above arrangement.

The image forming apparatus comprises an image forming unit for forming an electrostatic latent image on the basis of an image signal and developing the electrostatic latent image with toner to form a toner image, and a fixing unit for fixing the formed toner image, wherein the fixing unit includes the heating unit.

The image forming apparatus desirably further comprises an image forming control unit for controlling to stop image formation by the image forming unit when the image forming apparatus is notified from the power supply of occurrence of an excess current or occurrence of disconnection, and a display unit for displaying an error message upon the stop of image formation.

According to still another aspect of the present invention, preferably, there is provided an electric current supply method for a power supply which supplies an AC electric current to a coil of a heating unit employing an electromagnetic induced heating method via a connector connecting a plurality of wires.

The method comprises the steps of supplying electric currents to the coil via first and second wires from first and second electric current supply devices and detecting electric currents fed back via third and fourth wires through the coil. The method further comprises the steps of monitoring, on the basis of the detected electric currents, an abnormality of supply of an electric current to the coil or an abnormality of the third wire or the fourth wire, and controlling, in accordance with the monitoring result, to stop driving the first and second electric current supply devices and supply an electric current to the coil.

The invention is particularly advantageous since supply of an electric current from the power supply to the coil is divided into a plurality of wires and no large electric current flows through each wire. Further, the invention has an effect of preventing erroneous flow of a large electric current since an abnormality of supply of an electric current to the coil or an abnormality of the third wire or the fourth wire is monitored and it is controlled in accordance with the monitoring result to stop driving the first and second electric current supply devices.

Accordingly, a large electric current can be supplied using a widespread, relatively low-cost connector for a relatively small electric current.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a timing chart showing waveforms when an excess current flows through a coil L due to an abnormal state or the like;

DESCRIPTION OF THE EMBODIMENTS

Preferred embodiments of the present invention will now be described in detail in accordance with the accompanying drawings.

However, building components described in the following embodiments are merely illustrative, and may not be construed to limit the scope of the present invention to only them.

Figure 1:
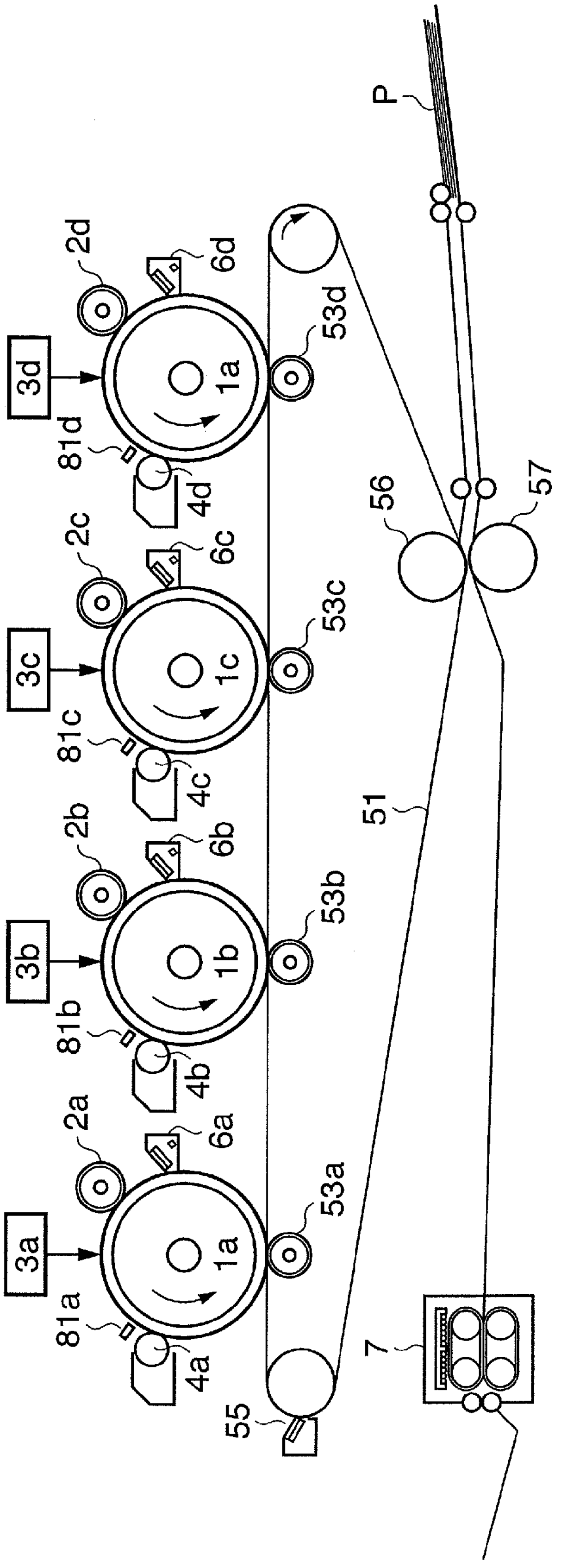
FIG. 1 is a side sectional view showing the structure of an image forming apparatus which forms a color image according to the electrophotographic method as a typical embodiment of the present invention.

FIG. 1 is a side sectional view showing the schematic structure of an image forming apparatus which forms a color image according to the electrophotographic method as a typical embodiment of the present invention.

In FIG. 1, reference numerals 1*a* to 1*d* denote photosensitive bodies; 2*a* to 2*d*, primary charging units; 3*a* to 3*d*, exposure units; 4*a* to 4*d*, developing units; 53*a* to 53*d*, primary transfer units; 6*a* to 6*d*, cleaners; 51, an intermediate transfer belt; 55, an intermediate transfer belt cleaner; and 56 and 57, secondary transfer units. After the photosensitive bodies 1*a* to 1*d* are uniformly charged by the primary charging units 2*a* to 2*d*, they are exposed by the exposure units 3*a* to 3*d* in accordance with image signals of a plurality of developing colors (Y, M, C, and K). As a result, electrostatic latent images corresponding to the color density components are formed on the photosensitive bodies 1*a* to 1*d*. The developing units 4*a* to 4*d* develop the electrostatic latent images, and the primary transfer units 53*a* to 53*d* transfer the multiple toner images on the four photosensitive bodies 1*a* to 1*d* onto the intermediate transfer belt 51. The secondary transfer units 56 and 57 transfer the transferred multiple toner images onto a printing medium P.

The cleaners 6*a* to 6*d* collects residual toners on the photosensitive bodies 1*a* to 1*d* after transfer and the intermediate transfer belt cleaner 55 collects residual toner on the intermediate transfer belt 51 after transfer. Finally, a fixing unit 7 fixes the toner image transferred on the printing medium P, obtaining a color image. This embodiment uses the fixing unit 7 which employs the electromagnetic induced heating method.

Figure 2:
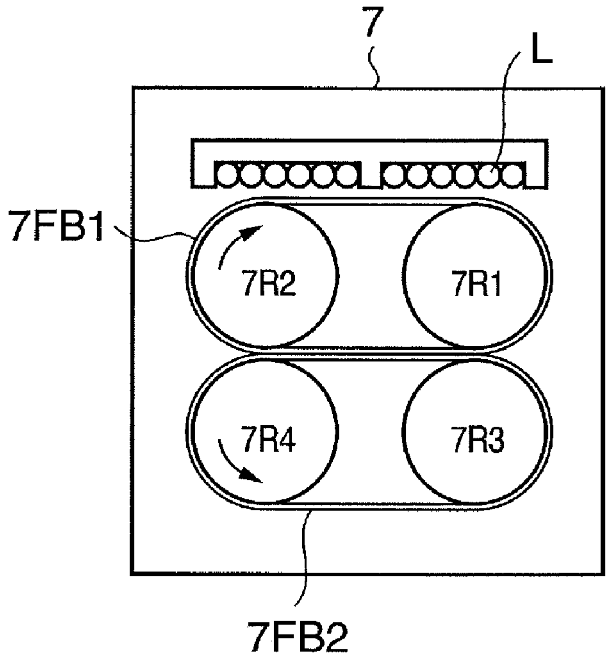
FIG. 2 is a view showing the structure of a fixing unit 7 which employs the electromagnetic induced heating method.

FIG. 2 is a view showing the structure of the fixing unit 7 which employs the electromagnetic induced heating method.

In FIG. 2, reference symbols 7FB1 and 7FB2 denote belt-like conductive heating members which are moved by rollers 7R1, 7R2, 7R3, and 7R4 rotating in directions indicated by arrows in FIG. 2. A coil L opposes the conductive heating member 7FB1. By supplying a high-frequency AC electric current to the coil L to generate a magnetic field, the conductive heating member 7FB1 generates heat.

Embodiments of a power supply for supplying power to a fixing unit which is mounted in the image forming apparatus and operates by the electromagnetic induced heating method will be explained.

First Embodiment

Figure 3:
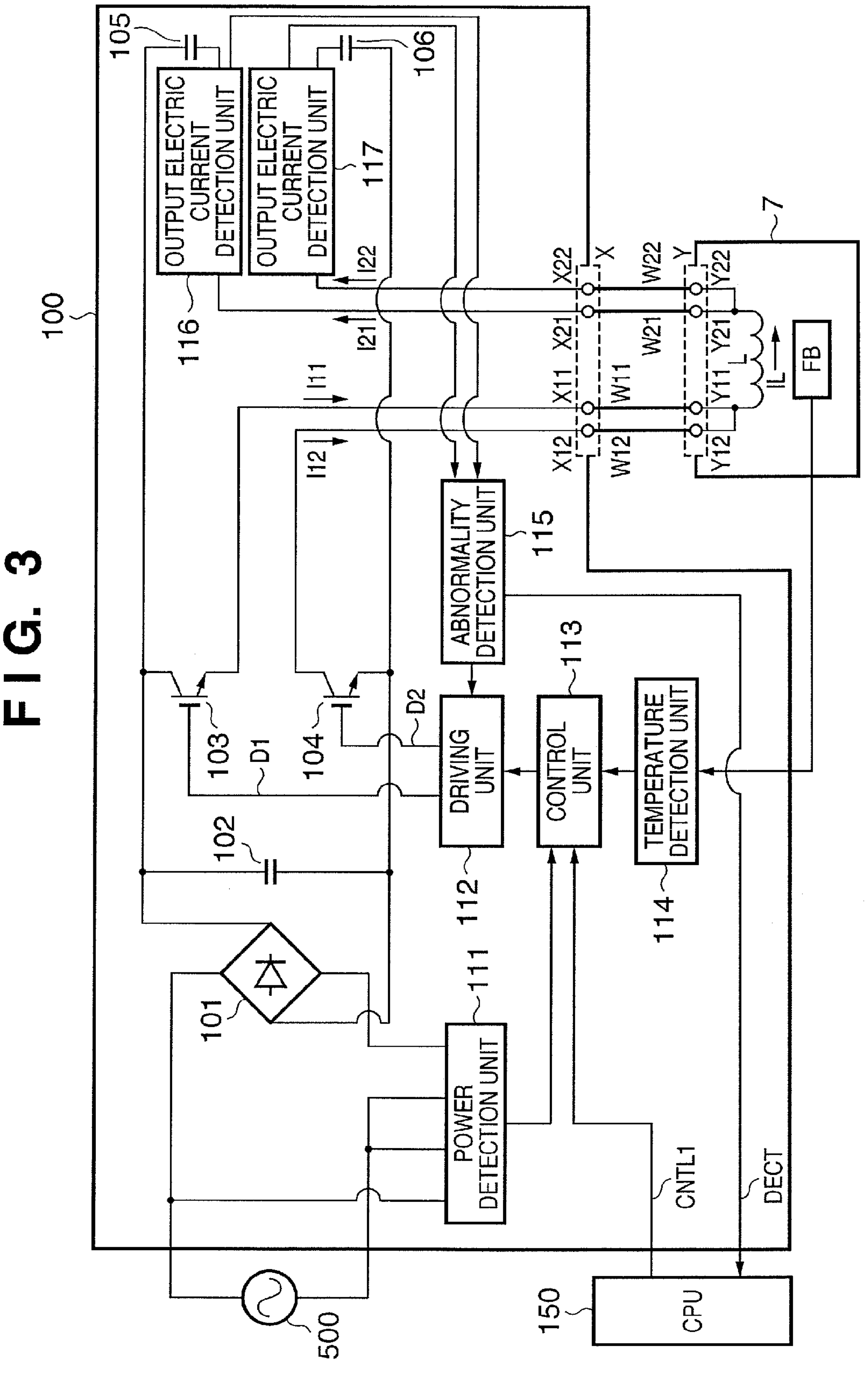
FIG. 3 is a block diagram showing the arrangement of a power supply 100 and wiring to a fixing unit 7 which employs the electromagnetic induced heating method, according to the first embodiment of the present invention.

FIG. 3 is a block diagram showing the arrangement of a power supply 100 and wiring to a fixing unit 7 which employs the electromagnetic induced heating method. In FIG. 3, the same reference numbers and symbols denote the same building elements and signals as those described in the prior art, and a description thereof will be omitted.

In FIG. 3, reference numeral 150 denotes a CPU which controls a series of operations of the image forming apparatus and operates/stops the power supply 100 by an operation signal CNTL1 containing information on a set power and set temperature. Reference symbols W11, W12, W21, and W22 denote power supply-coil connecting wires which connect the power supply 100 and fixing unit 7.

Figure 12:
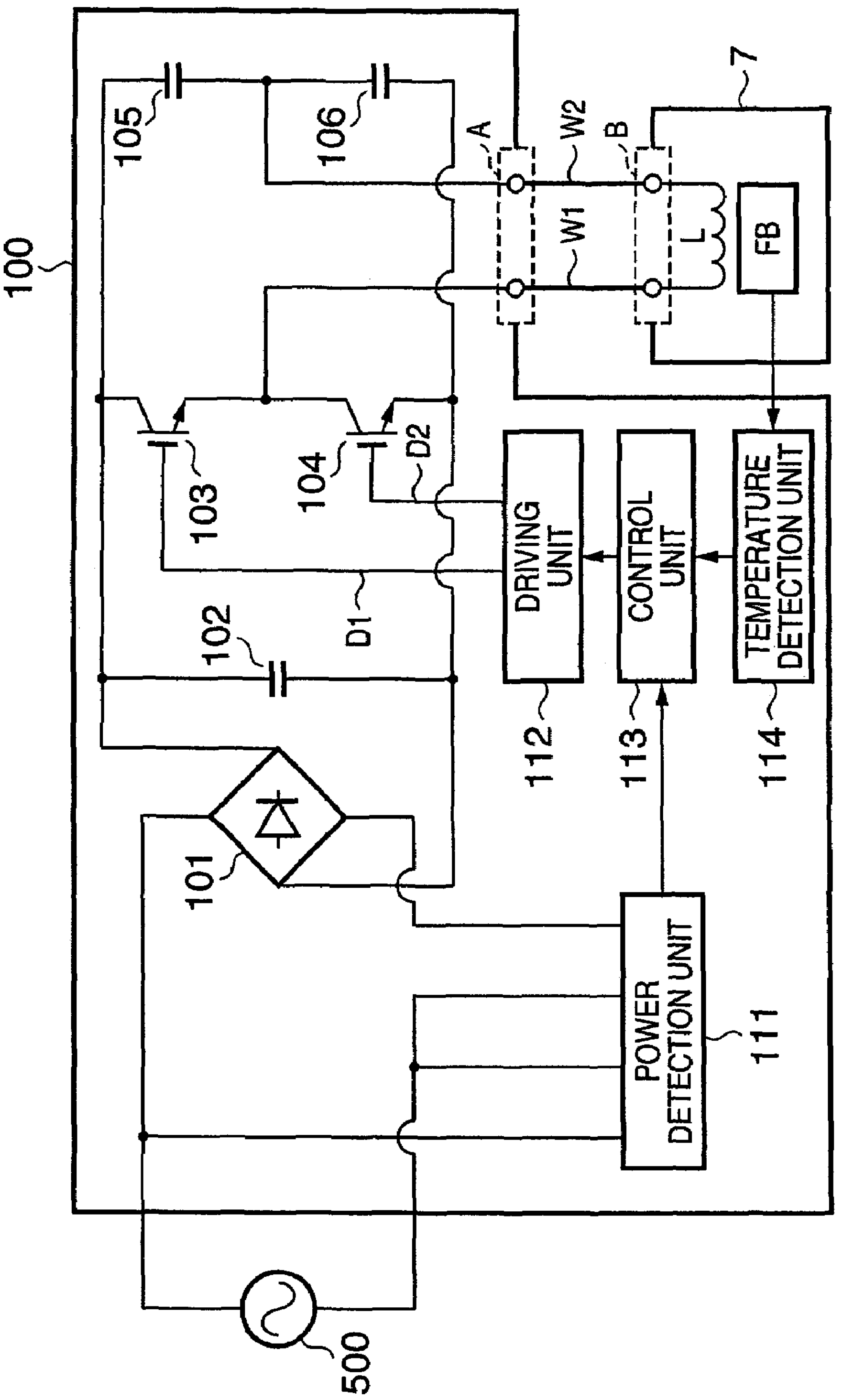
FIG. 12 PRIOR ART
FIG. 12 is a block diagram showing the conventional arrangement of a power supply which supplies power to a fixing unit using the electromagnetic induced heating method.

The power supply 100 is connected to an AC power supply 500 such as a commercial power supply. In addition to the building elements shown in FIG. 12, the power supply 100 comprises an abnormality detection unit 115 and two output electric current detection units 116 and 117, which will be described in detail later. The power supply 100 and fixing unit 7 are connected to each other by connectors X and Y. The connectors X and Y comprise widespread 4-pole connectors for a small electric current.

The power supply 100 in the first embodiment is connected to a coil using four wires and 4-pole connectors so as to supply a total electric current larger than a rated electric current per pole. With this arrangement, electric currents flow through the respective poles nearly equally. The effective value of an electric current flowing through each wire can be smaller than that of an electric current flowing through a wire in the conventional arrangement shown in FIG. 12.

More specifically, the emitter of a switching element 103 is connected to the X11 pole of the connector X; the collector of a switching element 104, to the X12 pole of the connector X; a resonant capacitor 105, to the X21 pole of the connector X; and E a resonant capacitor 106, to the X22 pole of the connector X.

The wires W11 and W12 respectively connected to the X11 and X12 poles of the connector X are connected to one corresponding end of the induced heating coil L via the Y11 and Y12 poles of the connector Y of the fixing unit 7. The wires W21 and W22 respectively connected to the X21 and X22 poles of the connector X are connected to the other corresponding end of the induced heating coil L via the Y21 and Y22 poles of the connector Y of the fixing unit 7.

This structure increases a total electric current though the effective value of an electric current flowing through each pole of the connector is small. Consequently, a large electric current can be supplied to the coil L.

The output electric current detection unit 116 which detects an electric current I21 flowing through the wire W21 is interposed between the resonant capacitor 105 and the X21 pole of the connector X. The output electric current detection unit 117 which detects an electric current I22 flowing through the wire W22 is interposed between the resonant capacitor 106 and the X22 pole of the connector X. The power supply 100 comprises the abnormality detection unit 115 which determines, from the detection results of the two output electric current detection units 116 and 117, whether the electric current value is normal or abnormal, and forcibly stops driving signals D1 and D2 from a driving unit 112. A detection signal (DECT) from the abnormality detection unit 115 is transferred to the driving unit 112, and also to the CPU 150.

An operation when the electric current of the power supply normally flows in the arrangement shown in FIG. 3 will be explained.

When an operation instruction is set by the operation signal CNTL1 from the CPU 150, the power supply 100 starts operating. Note that the operation signal CNTL1 contains information on power supplied to the coil L and the target temperature of the fixing unit 7.

Using a characteristic in which power increases when decreasing the driving frequency of the coil L, a control unit 113 compares a temperature (T) represented by the detection result of the temperature detection unit 114 with a set temperature (Ts). If $T<Ts$ holds, the control unit 113 compares a power (P) represented by the detection result of the power detection unit 111 with a set power (Ps). If $P<Ps$ holds, the control unit 113 decreases the frequencies of the driving signals D1 and D2 output from the driving unit 112 to switch the switching elements 103 and 104. If $P=Ps$ holds, the control unit 113 changes the driving signals D1 and D2 to frequencies which provide the set power (Ps).

If $T=Ts$ holds, the control unit 113 increases the frequencies of D1 and D2 from the driving unit 112, and decreases the power (P).

By repeating the above operation, the control unit 113 controls the temperature of a heating member FB to be the set temperature. During this control, the output electric current detection units 116 and 117 detect the electric currents I21 and I22, and the abnormality detection unit 115 monitors the detection results of the output electric current detection units 116 and 117.

Figure 4:
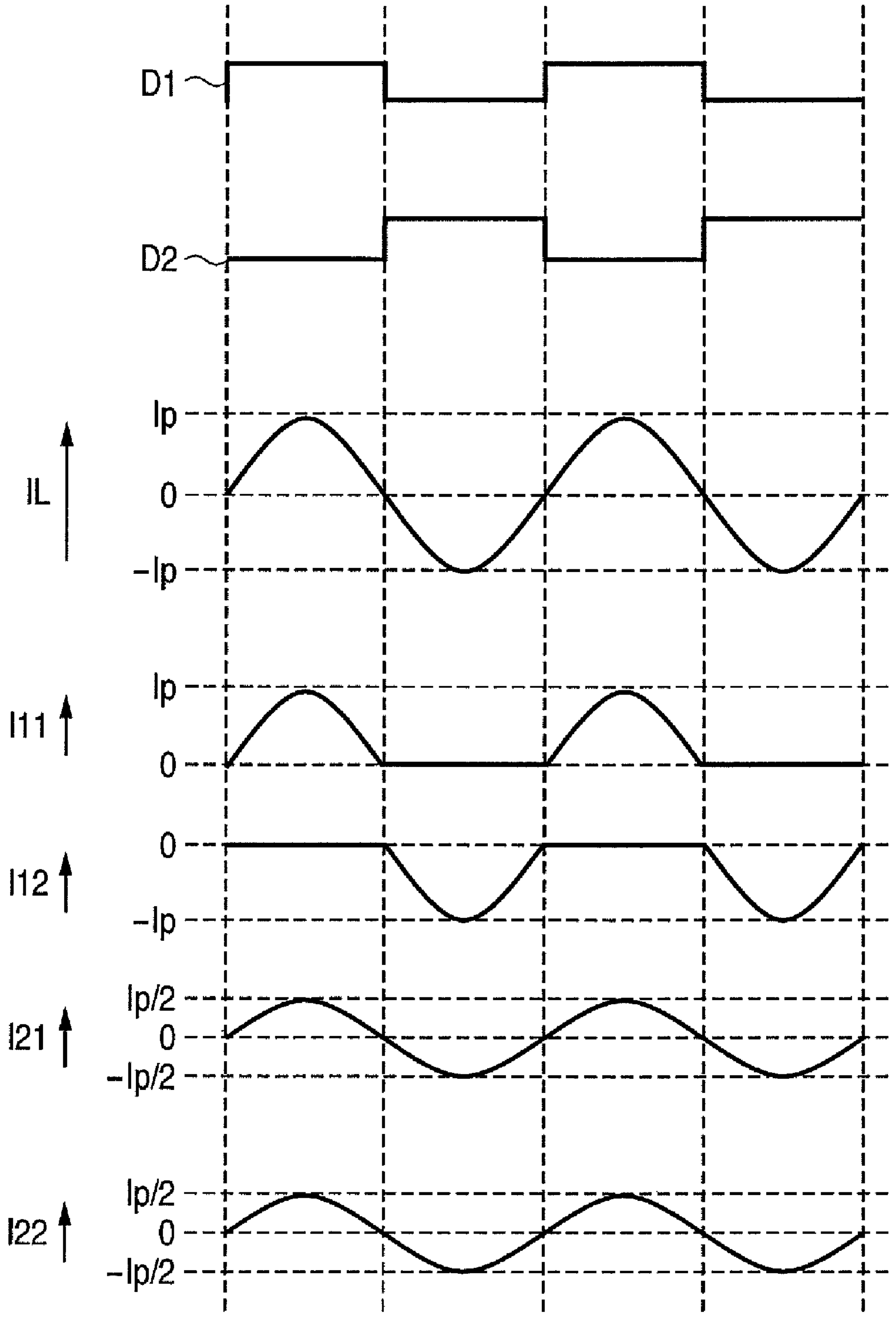
FIG. 4 is a timing chart showing the waveforms of the respective units of the power supply 100 in a normal operation.

FIG. 4 is a timing chart showing the waveforms of the respective units of the power supply 100 when an electric current is normally supplied.

In FIG. 4, reference symbols D1 and D2 denote driving signals for the switching elements 103 and 104. The driving signals D1 and D2 shift from each other by half the cycle. In practice, a period (dead time) is set during which the signal levels of both the driving signals D1 and D2 change to low level (L).

Reference symbol IL denotes an electric current flowing through the coil L; I11 and I12, electric currents flowing through the switching elements 103 and 104 (i.e., electric currents flowing through the wires W11 and W12); and I21 and I22, electric currents flowing through the resonant capacitors 105 and 106 (i.e., electric currents flowing through the wires W21 and W22). These electric currents have a relation: I11+I12=I21+I22=IL. Ip represents the peak electric current of the coil electric current IL in a normal operation. At this time, the peak electric currents of I21 and I22 are almost Ip/2. The electric currents I11 and I12 flow through the switching elements 103 and 104 alternately every half the cycle. Although the peak electric currents of I11 and I12 are IL, I11 and I12 do not simultaneously rise to the peak value, and thus the effective values of I11 and I12 can decrease. Hence, the connectors X and Y can employ connectors for a small current.

Figure 5:
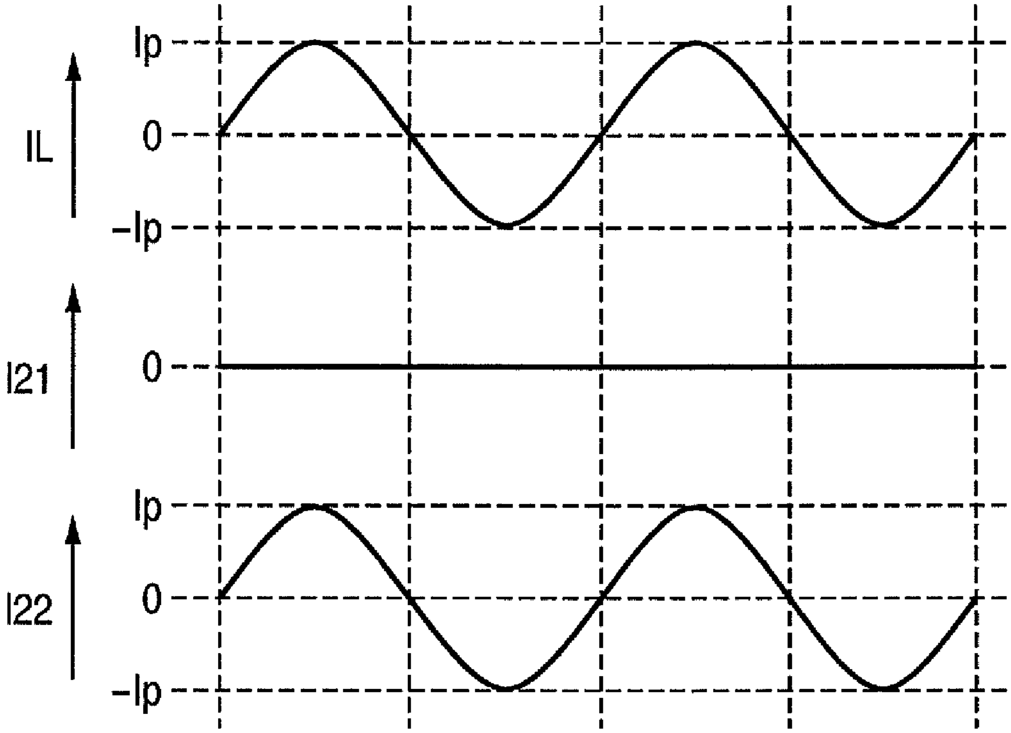
FIG. 5 is a timing chart showing the waveforms of electric currents IL, I21, and I22 when a wire W21 is disconnected.

FIG. 5 is a timing chart showing the waveforms of the electric currents IL, I21, and I22 when the wire W21 is disconnected. Since the wire W21 is disconnected, all the coil electric current IL flows through the wire W22, and I22=IL.

Figure 6:
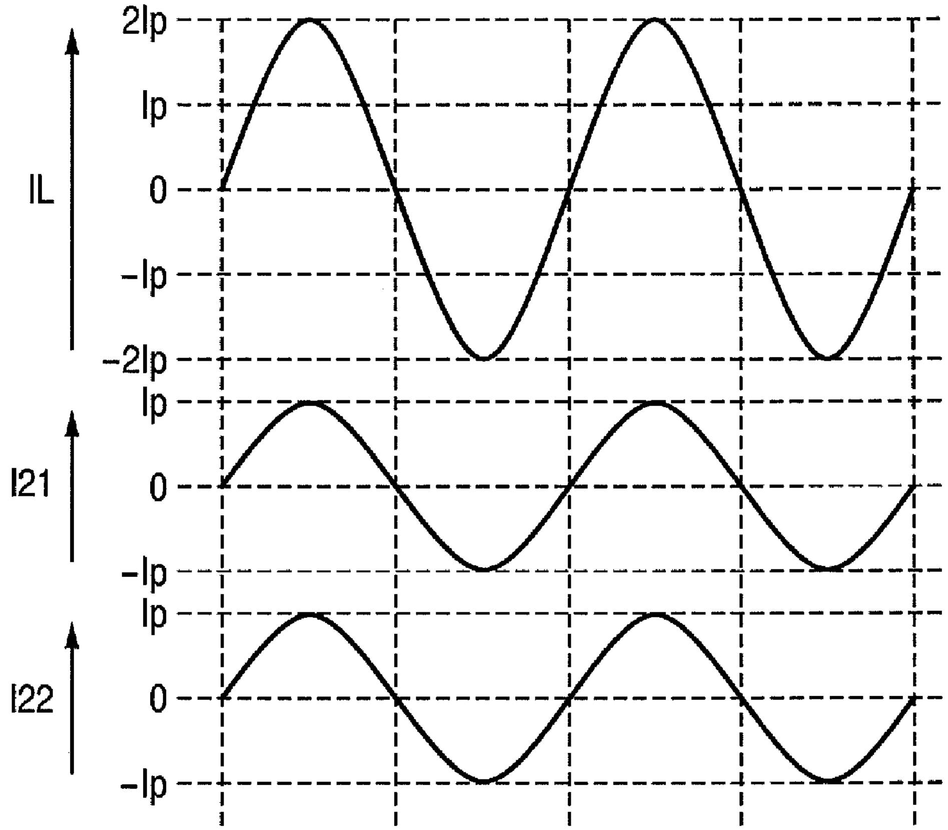

FIG. 6 is a timing chart showing waveforms when an excess current flows through the coil L due to an abnormal state or the like. FIG. 6 shows waveforms when IL becomes double the electric current value in a normal state. In this case, since the electric currents I21, I22, and IL increase at almost the same rate, the peak electric current of IL is 2×Ip and those of I21 and I22 are Ip.

In the two cases shown in FIGS. 5 and 6, electric currents larger than normally supplied ones flow through wires and the poles of connectors, and the wires and connectors may be damaged.

Considering the above-described characteristic, operations of the power supply according to the first embodiment when an excess current flow occurs due to an abnormal load state or the like in the power supply and when the wire W21 is disconnected will be explained with reference to the timing charts of signal waveforms shown in FIGS. 7 and 8.

Figure 7:
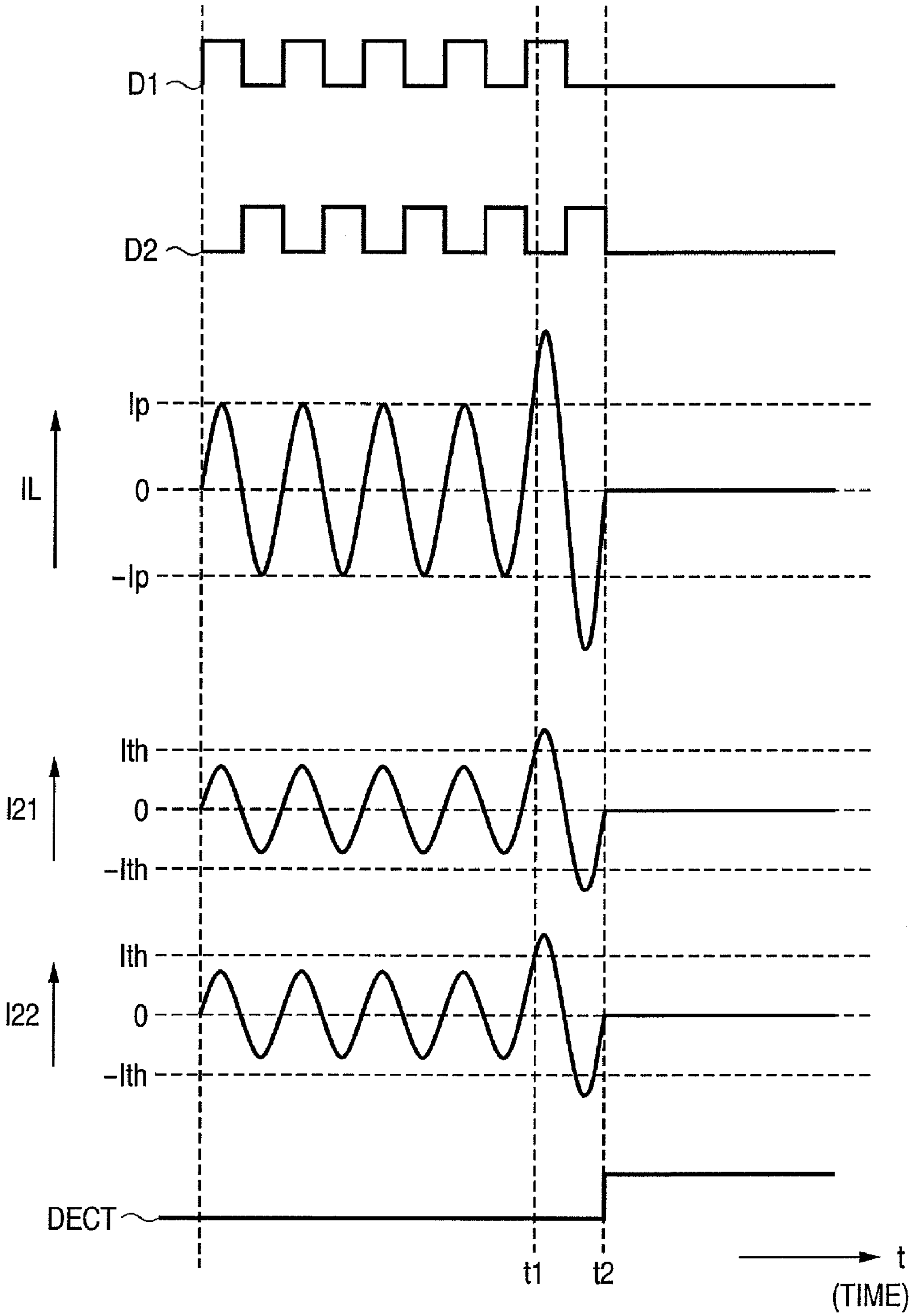
FIG. 7 is a timing chart showing a detection signal (DECT) and the signal waveform of an electric current flowing through an output electric current detection unit when an excess current flows through the coil L.

FIG. 7 is a timing chart showing the detection signal (DECT) and the signal waveforms of electric currents flowing through the output electric current detection units 116 and 117 when an excess current flows through the coil L.

As shown in FIG. 7, if an excess current flows through the coil at time t=t1, the abnormality detection unit 115 detects that the peak electric currents of both I21 and I22 exceed an abnormal level Ith (−Ith) set higher than the peak electric current Ip/2 in the steady state.

The abnormality detection unit 115 directly notifies the driving unit 112 of the abnormality, and the driving unit 112 forcibly stops driving the switching elements 103 and 104 in the next signal cycle regardless of a signal from the control unit 113. FIG. 7 shows that supply of the driving signals D1 and D2 stops after time t=t2. At time t=t2, the abnormality detection unit 115 outputs, to the CPU 150, the detection signal (DECT) indicating occurrence of the abnormality. Upon reception of the detection signal (DECT), the CPU 150 stops operating the power supply 100 using the operation signal CNTL1, and stops the image forming operation. Further, the CPU 150 performs a process to, e.g., display an error message on the display unit (not shown) of the image forming apparatus.

Figure 8:
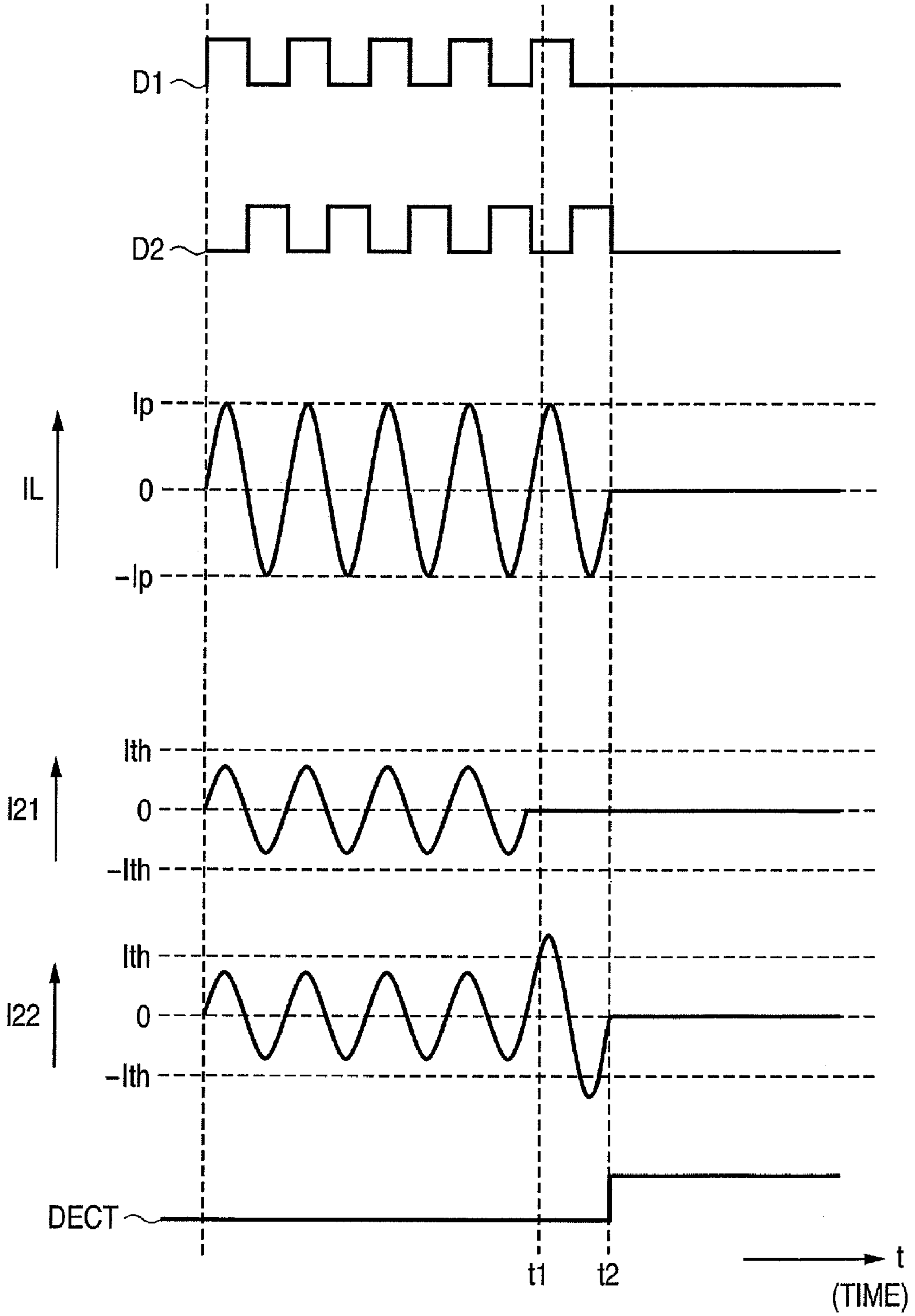
FIG. 8 is a timing chart showing the detection signal (DECT) and the signal waveform of an electric current flowing through the output electric current detection unit when part of a wire is disconnected.

FIG. 8 is a timing chart showing the detection signal (DECT) and the signal waveforms of electric currents flowing through the output electric current detection units 116 and 117 when part of a wire is disconnected.

In an example shown in FIG. 8, the electric current I21 is “0 (zero)” after time t=t1, which represents that the wire W21 is disconnected. In this case, the coil electric current IL is not abnormal, but an electric current is concentrated on the wire W22 because no electric current flows through the wire W21. Hence, the abnormality detection unit 115 detects that the peak electric current of I22 exceeds the abnormal level Ith (−Ith) set higher than the peak electric current Ip/2 in the steady state.

The abnormality detection unit 115 directly notifies the driving unit 112 of the abnormality, and the driving unit 112 forcibly stops driving the switching elements 103 and 104 in the next signal cycle regardless of a signal from the control unit 113. FIG. 8 shows that supply of the driving signals D1 and D2 stops after time t=t2. At time t=t2, the abnormality detection unit 115 outputs, to the CPU 150, the detection signal (DECT) indicating occurrence of the abnormality. Upon reception of the detection signal (DECT), the CPU 150 stops operating the power supply 100 using the operation signal CNTL1, and stops the image forming operation. Further, the CPU 150 performs a process to, e.g., display an error message on the display unit (not shown) of the image forming apparatus.

According to the above-described embodiment, when an excess current or disconnection occurs due to an abnormal load state or the like, the excess current or disconnection can be detected to forcibly stop driving the switching element and stop supplying an electric current to the coil of the fixing unit. This can prevent the flow of a large electric current through the connector or wire in an abnormal state.

Under this control, even a general connector whose rated current per pole is relatively small can be used for connection between the power supply and the fixing unit. Since no excess current flows, the connection wire can be made thin, and the power loss on the connection wire can be reduced.

Second Embodiment

Figure 9:
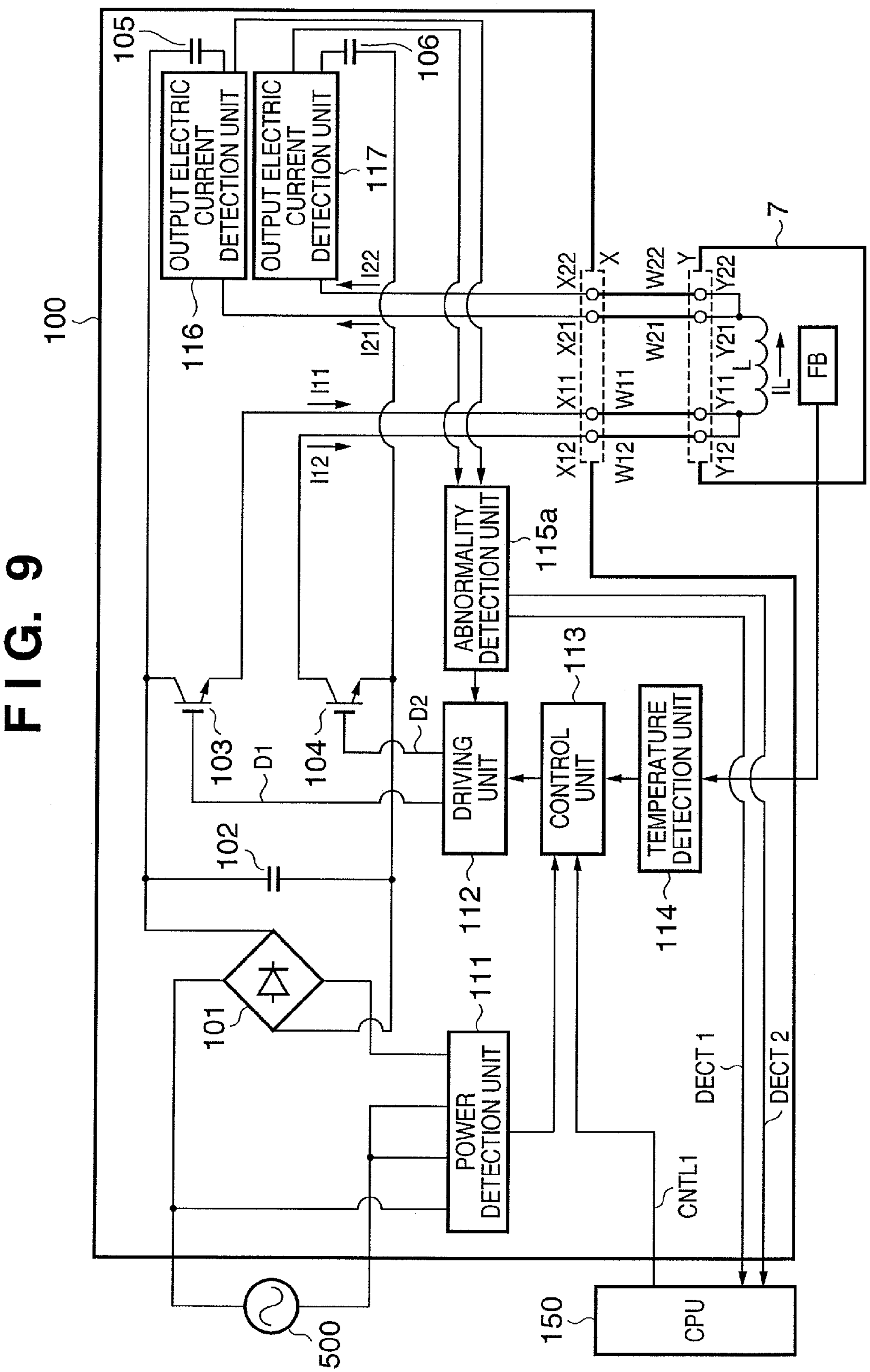
FIG. 9 is a block diagram showing the arrangement of a power supply 100 and wiring to a fixing unit 7 which employs the electromagnetic induced heating method, according to the second embodiment of the present invention.

FIG. 9 is a block diagram showing the arrangement of a power supply 100 and wiring to a fixing unit 7 which employs the electromagnetic induced heating method. In FIG. 9, the same reference numbers and symbols denote the same building elements and signals as those described in the prior art and the first embodiment, and a description thereof will be omitted. Only a characteristic arrangement and operation in comparison with the first embodiment will be described, and a description of an arrangement and operation common to those in the first embodiment will be omitted.

Unlike the arrangement described in the first embodiment, the power supply 100 according to the second embodiment comprises an abnormality detection unit 115*a* capable of transferring two different detection signals (DECT1 and DECT2) to a CPU 150.

In the power supply 100 according to the second embodiment, when an electric current normally flows, a driving unit 112 is controlled to adjust the temperature of a heating member FB to a set one while the detection result of a power detection unit 111 and that of a temperature detection unit 114 are compared with a set power and set temperature, respectively, similar to the first embodiment. During this control, output electric current detection units 116 and 117 detect electric currents I21 and I22. From the detection results of the output electric current detection units 116 and 117, the abnormality detection unit 115*a* monitors whether or not the peak electric currents of I21 and I22 exceed an abnormal level Ith (−Ith) set higher than the peak electric current Ip/2 in the steady state. On the basis of the detection results, the abnormality detection unit 115*a* generates two different detection signals to be described below.

Operations when an excess current flow occurs due to an abnormal load state or the like and when a wire W21 is disconnected in the power supply according to the second embodiment will be explained with reference to the timing charts of signal waveforms shown in FIGS. 10 and 11.

Figure 10:
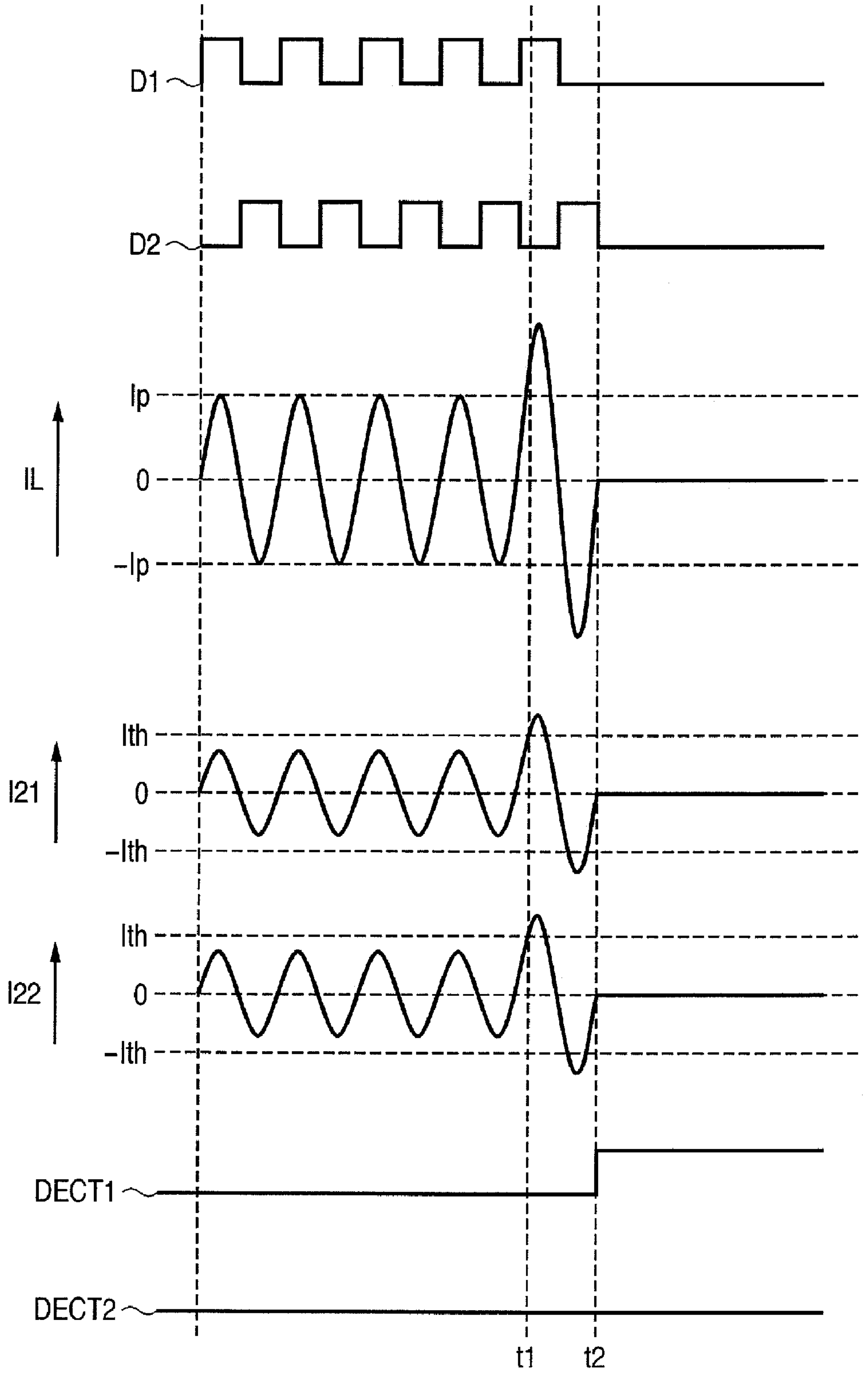
FIG. 10 is a timing chart showing two detection signals (DECT1 and DECT2) and the signal waveform of an electric current flowing through the output electric current detection unit when an excess current flows through the coil L.

FIG. 10 is a timing chart showing the two different detection signals (DECT1 and DECT2) and the signal waveforms of electric currents flowing through the output electric current detection units 116 and 117 when an excess current flows through a coil L.

As shown in FIG. 10, if an excess current flows through the coil L at time t=t1, the abnormality detection unit 115*a* detects that the peak electric currents of both I21 and I22 exceed the abnormal level Ith (−Ith) set higher than the peak electric current Ip/2 in the steady state.

Control to forcibly stop operating the driving unit 112 at this time is the same as that in the first embodiment. In the second embodiment, however, if the difference between the peak electric currents of the electric currents I21 and I22 is smaller than a predetermined value (e.g., Ip/2) at time t=t2, the abnormality detection unit 115*a* outputs, to the CPU 150, the detection signal (DECT1) indicating that an excess current flows. At this time, the other detection signal (DECT2) remains at low level. In accordance with these detection signals, similar to the first embodiment, the CPU 150 stops operating the power supply 100, and stops the image forming operation. Further, the CPU 150 performs a process to, e.g., display an error message on the display unit (not shown) of the image forming apparatus.

Figure 11:
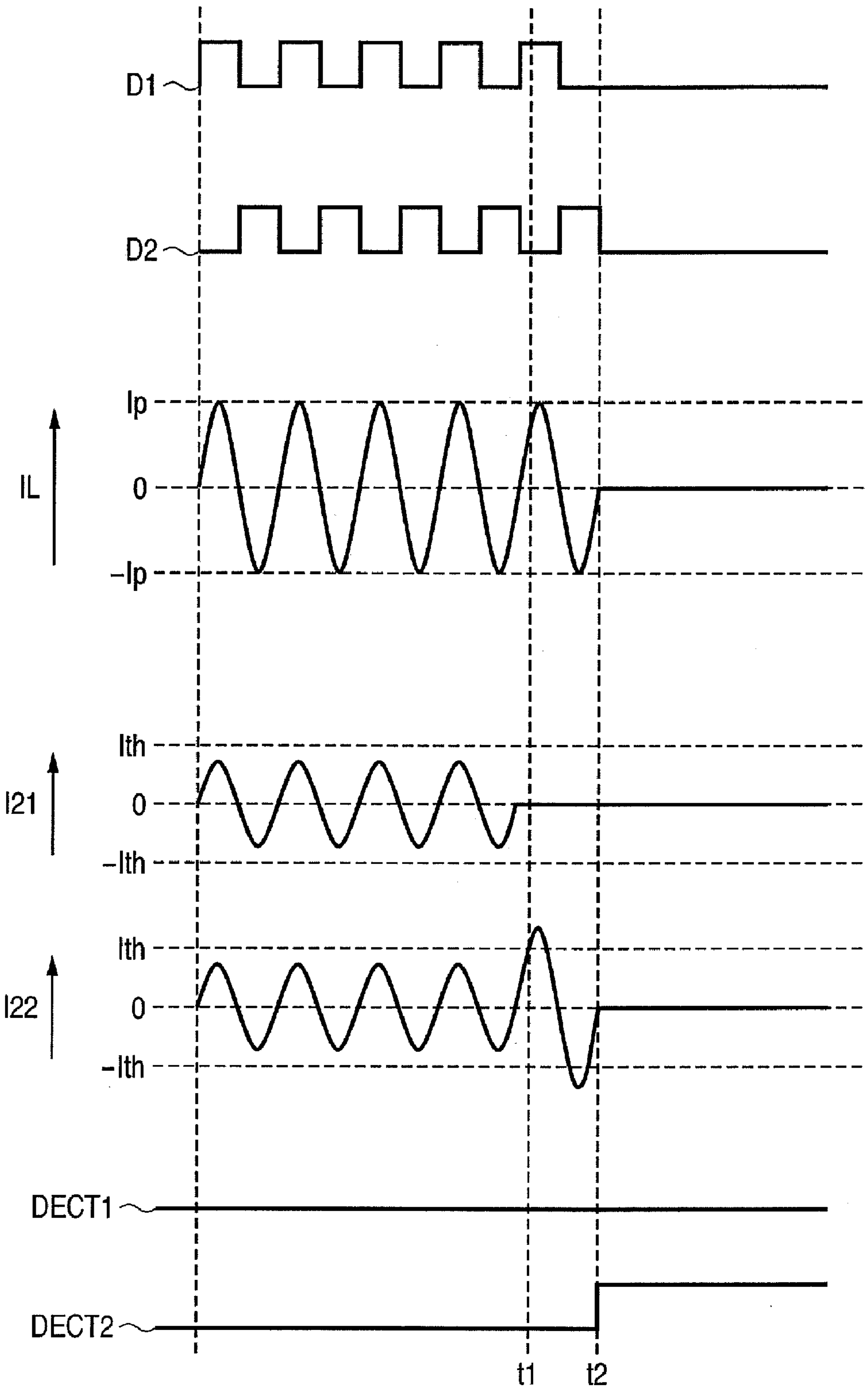
FIG. 11 is a timing chart showing the two detection signals (DECT1 and DECT2) and the signal waveform of an electric current flowing through the output electric current detection unit when part of a wire is disconnected.

FIG. 11 is a timing chart showing the two different detection signals (DECT1 and DECT2) and the signal waveforms of electric currents flowing through the output electric current detection units 116 and 117 when part of a wire is disconnected.

In an example shown in FIG. 11, the electric current I21 is “0 (zero)” after time t=t1, which represents that the wire W21 is disconnected. In this case, a coil electric current IL is not abnormal, but an electric current is concentrated on the wire W22 because no electric current flows through the wire W21. Thus, the abnormality detection unit 115*a* detects that the peak electric current of I22 exceeds the abnormal level Ith (−Ith) set higher than the peak electric current Ip/2 in the steady state.

Control to forcibly stop operating the driving unit 112 at this time is the same as that in the first embodiment. In the second embodiment, however, if the difference between the peak electric currents of the electric currents I21 and I22 is greater than a predetermined value (e.g., Ip/2) at time t=t2, the abnormality detection unit 115*a* outputs, to the CPU 150, the detection signal (DECT2) indicating that disconnection occurs. At this time, the other detection signal (DECT1) remains at low level. In accordance with these detection signals, similar to the first embodiment, the CPU 150 stops operating the power supply 100, and stops the image forming operation. Further, the CPU 150 performs a process to, e.g., display an error message on the display unit (not shown) of the image forming apparatus.

According to the second embodiment, in addition to the effects described in the first embodiment, occurrence of an excess current due to an abnormal load state or the like and disconnection of a wire can be announced by different detection signals.

In the first and second embodiments described above, the power supply and fixing unit are connected to each other by two pairs of (four) wires to supply electric currents through the two pairs of wires. However, the present invention is not limited to this. For example, the power supply and fixing unit may be connected to each other by more than two pairs of wires, such as three pairs of (six) wires or four pairs of (eight) wires, to supply electric currents.

In the first and second embodiments described above, an excess current flow or disconnection is detected on the basis of the peak electric current value. Alternatively, an abnormality may be determined on the basis of the effective value or average value of an AC electric current over several cycles (e.g., one to three cycles).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-249951, filed Aug. 30, 2005, which is hereby incorporated by reference herein in its entirety.

What is claimed is:

1. A power supply which supplies an AC electric current to a coil of a heating unit employing an electromagnetic induced heating method via a connector connecting a plurality of wires, comprising:

- a first electric current supply device which supplies an electric current to the coil via a first wire;
- a second electric current supply device which supplies an electric current to the coil via a second wire;
- a first detection device which detects an electric current fed back to the power supply via a third wire through the coil;
- a second detection device which detects an electric current fed back to the power supply via a fourth wire through the coil;
- an abnormality monitoring device which monitors an abnormality of supply of an electric current to the coil or an abnormality of the third wire or the fourth wire on the basis of the electric currents detected by said first detection device and said second detection device; and
- a control device which controls to stop driving said first electric current supply device and said second electric current supply device in accordance with a monitoring result by said abnormality monitoring device.

2. The power supply according to claim 1, wherein

- connectors are respectively arranged on the heating unit and the power supply,
- each of the connectors has at least a first pole, second pole, third pole, and fourth pole which connect the first wire, second wire, third wire, and fourth wire, respectively,
- one end of the coil is connected to the first pole and second pole of the connector on the heating unit, and
- the other end of the coil is connected to the third pole and fourth pole of the connector on the heating unit.

3. The power supply according to claim 1, wherein each of said first detection device and said second detection device comprises a comparison device which compares a peak value of the feedback electric current with a predetermined threshold.

4. The power supply according to claim 3, wherein said abnormality monitoring device determines that an excess current occurs when peak values of both the electric currents fed back via the third wire and the fourth wire exceed the predetermined threshold as a result of comparisons by said comparison device of said first detection device and said second detection device, and

- determines that a wire is disconnected when the peak value of one of the feedback electric currents via the third wire and the fourth wire exceeds the predetermined threshold and the other of the feedback electric currents is “zero”

as a result of comparisons by said comparison device of said first detection device and said second detection device.

5. The power supply according to claim 4, wherein said abnormality monitoring device notifies an external device by a signal indicating occurrence of the excess current or occurrence of the disconnection.

6. The power supply according to claim 5, wherein said abnormality monitoring device notifies the external device of occurrence of the excess current by a first signal, and of occurrence of the disconnection by a second signal.

7. The power supply according to claim 1, wherein each of said first electric current supply device and said second electric current supply device includes:

a switching element; and a driving circuit which drives the switching element by supplying a driving signal to the switching element.

8. The power supply according to claim 7, wherein said control device controls to forcibly stop driving the switching element by said driving circuit upon occurrence of an excess current or occurrence of disconnection.

9. An image forming apparatus, for forming an image according to an electrophotographic method, to which an electric current is supplied from a power supply according to claim 1, comprising:

an image forming unit for forming an electrostatic latent image on the basis of an image signal and developing the electrostatic latent image with toner to form a toner image; and a fixing unit for fixing the toner image formed by said image forming unit, wherein said fixing unit includes the heating unit.

10. The apparatus according to claim 9, further comprising:

an image forming control unit for controlling to stop image formation by said image forming unit when the image forming apparatus is notified from the power supply of occurrence of an excess current or occurrence of disconnection; and a display unit for displaying an error message upon the stop of image formation.

11. An electric current supply method for a power supply which supplies an AC electric current to a coil of a heating unit employing an electromagnetic induced heating method via a connector connecting a plurality of wires, comprising:

a first detection step of supplying an electric current to the coil via a first wire from a first electric current supply device and detecting an electric current fed back to the power supply via a third wire through the coil;

a second detection step of supplying an electric current to the coil via a second wire from a second electric current supply device and detecting an electric current fed back to the power supply via a fourth wire through the coil;

an abnormality monitoring step of monitoring an abnormality of supply of an electric current to the coil or an abnormality of the third wire or the fourth wire on the basis of the electric currents detected at said first and second detection steps; and a control step of controlling to stop driving the first electric current supply device and the second electric current supply device and supply an electric current to the coil in accordance with a monitoring result at said abnormality monitoring step.

12. A power supply which supplies an alternating electric current to a coil of a heating unit employing an electromagnetic induced heating method via a connector connecting a plurality of wires, comprising:

a connector, with a first, second, third and fourth terminals, used for supplying the alternating current to the coil;

a circuit for supplying a direct voltage;

a group of wires which include:

a first wire which extends from a first terminal of the circuit to the first terminal of the connector;

a second wire which extends from a second terminal of the circuit to the second terminal of the connector;

a third wire which extends from the first terminal of the circuit to the third terminal of the connector; and a fourth wire which extends from the second terminal of the circuit to the fourth terminal of the connector;

a group of switches which include a first switching element inserted in the first wire and a second switching element inserted in the second wire;

a group of capacitors which include a first capacitor inserted in the third wire and a second capacitor inserted in the fourth wire; and a driving circuit which alternately turns on the first and second switching elements according to a predetermined frequency.

* * * * *